(12) United States Patent
Kane

(10) Patent No.: US 8,595,007 B2
(45) Date of Patent: Nov. 26, 2013

(54) VOICE PRINT RECOGNITION SOFTWARE SYSTEM FOR VOICE IDENTIFICATION AND MATCHING

(75) Inventor: James A. Kane, Wellington, FL (US)

(73) Assignee: NITV Federal Services, LLC, West Palm Beach, FL (US)

( * ) Notice: Subject to any disclaimer, the term of this patent is extended or adjusted under 35 U.S.C. 154(b) by 1247 days.

(21) Appl. No.: 11/758,474

(22) Filed: Jun. 5, 2007

(65) Prior Publication Data

US 2008/0091425 A1 Apr. 17, 2008

Related U.S. Application Data

(60) Provisional application No. 60/813,847, filed on Jun. 15, 2006.

(51) Int. Cl.
*G10L 15/00* (2013.01)

(52) U.S. Cl.
USPC ........... 704/246; 704/247; 704/273; 704/500; 455/410; 455/411

(58) Field of Classification Search
USPC .................... 704/247, 246, 500, 273; 455/411
See application file for complete search history.

(56) References Cited

U.S. PATENT DOCUMENTS

| | | | |
|---|---|---|---|
| 4,773,093 A * | 9/1988 | Higgins et al. | 704/247 |
| 6,587,739 B1 * | 7/2003 | Abrams et al. | 700/83 |
| 7,634,063 B2 * | 12/2009 | Mardirossian | 379/38 |
| 2003/0229492 A1 * | 12/2003 | Nolan | 704/247 |
| 2004/0029564 A1 * | 2/2004 | Hodge | 455/411 |
| 2004/0131160 A1 * | 7/2004 | Mardirossian | 379/38 |
| 2005/0125226 A1 * | 6/2005 | Magee | 704/246 |

* cited by examiner

*Primary Examiner* — Douglas Godbold
*Assistant Examiner* — Mark Villena
(74) *Attorney, Agent, or Firm* — McHale & Slavin, P.A.

(57) ABSTRACT

Positive identification of local inhabitants plays an important role in modern military, police and security operations. Since terrorists use all means to masquerade as local inhabitants, the identification of terrorist or hostile suspects becomes an increasingly complicated task. The instant software solution will assist military, police and security forces in the identification of suspects using Voice Print Recognition (VPR) technology. Our VPR software will compare and recognize, or match, specific voice samples with stored, digital voice models (voice prints) for the purpose of establishing or verifying identity. VPR software will support an operator's decision and situational awareness through the verification of a person's identity (for instance: remote access control), but more importantly will assist in the identification of suspect individuals (identifying suspects among a large group of captured individuals). This second application is critical for the modern counter and anti-terrorist operations environment. The VPR system will be easy to use, fast, and helpful to users with minimal operational training. The VPR system will provide a method, as practiced on or via access to a computing device, which includes software for acquisition of voice records, storage of such records, identification algorithms, user and software interfaces. The system will also have server and client applications in its implementation.

36 Claims, 5 Drawing Sheets

VOICE PRINT RECOGNITION SOFTWARE SYSTEM FOR VOICE IDENTIFICATION AND MATCHING

REFERENCE TO RELATED APPLICATIONS

This application claims benefit of the filing date of Provisional Application 60/813,847, filed on Jun. 15, 2006, the contents of which are herein incorporated by reference.

FIELD OF THE INVENTION

This invention relates to voice print recognition, particularly to a system for passive development of a voice print recognition database; and most particularly to the utilization of such a database as a biometric tool to enable field operators to identify cooperative or uncooperative individuals.

BACKGROUND OF THE INVENTION

Human voice identification is based upon the premise that all human voices contain unique characteristics which can be distinguished from others using special analysis. Both the scientific and commercial communities agree that the human voice has qualities of uniqueness which can be used for biometric identification of individuals. Voiceprints include unique measurements of individual physiological characteristics, as well as the frequency, cadence and duration of vocal patterns. In fact, forms of this capability already exist for limited and controlled applications. Currently, software solutions based on fingerprints, iris or retinal scans have shown better identification/verification results than similar applications based on voiceprints. Nevertheless, the use of voice-based biometric solutions could be more appropriate in a variety of situations, such as the necessity for rapid, large-scale screening operations, mobile/field use, covert applications, scenarios requiring examinee acceptance, and scenarios involving a high probability of intentional masking or changes to self-biometric data. The aforementioned examinee acceptance refers to the fact that in many areas of the world there is strong cultural opposition to touching something that has been touched by many other people, while there is no such objection to speaking in to a microphone.

VoicePrint is a term that was introduced into the scientific community along with the appearance of voice spectrographic methods in the late 1940s. Compared with fingerprints, voiceprints are a more complicated object. Fingerprint theory rests on the premise that the human fingerprint (effectively a dactylographic image) does not change its structure/features during an individual's lifetime. In the case of voiceprints, voice signals are different for each record (even if a person repeats the same phrase). Therefore, a decision on which specific features should be extracted from the voice, and how they are extracted, is more complicated than the same decision regarding fingerprints. Furthermore, the selected features should be relatively permanent throughout a person's lifetime. In reality, in order to utilize voiceprint technology for identification, all voiceprint experts use several categories of voice features for analysis and make positive voice match decisions based upon matching several voice features in different categories.

Positive identification of local inhabitants plays an important role in modern military, police and security operations. Since terrorists use all means to masquerade as local inhabitants, the identification of terrorist or hostile suspects becomes an increasingly complicated task. The instant software solution will assist military, police and security forces in the identification of suspects using Voice Print Recognition (VPR) technology. Our VPR software will compare and recognize, or match, specific voice samples with stored, digital voice models (voice prints) for the purpose of establishing or verifying identity. VPR software will support an operator's decision and situational awareness through the verification of a person's identity (for instance: remote access control), but more importantly will assist in the identification of suspect individuals (identifying suspects among a large group of captured individuals). This second application is critical for the modern counter and anti-terrorist operations environment. The VPR system will be easy to use, fast, and helpful to users with minimal operational training. The VPR system will provide a method, as practiced on or via access to a computing device, which includes software for acquisition of voice records, storage of such records, identification algorithms, user and software interfaces. The system will also have server and client applications in its implementation.

SUMMARY OF THE INVENTION

A properly designed voiceprint product would take its place in the arsenal of biometric tools available to field operators, whose mission requirements involve frequent screening of large numbers of suspected individuals, as well as the search for specific suspected individuals. The instantly proposed VPR system can serve as a volume filter for solving tasks of massive suspect identification/verification and can trigger more thorough and time-consuming identification methods if necessary.

Therefore it is an objective of the instant invention to develop a roadmap for a VPR system.

It is a further objective to develop VoicePrint matching for verification of a person's identity (used with cooperative examinees).

It is still a further objective to develop VoicePrint matching for suspect identification (used with non-cooperative suspects).

It is yet another objective to develop VoicePrint matching for identification of a small number of highly wanted suspects. Algorithms behind this capability will be optimized for in-depth VoicePrint analysis and target suspect identification from the large set of existing voice records.

It is still another objective to develop VoicePrint matching for suspect identification from intercepted communications. Algorithms behind this capability will extract voice samples for suspect identification from intercepted signals which may be of low quality/bandwidth or high noise levels.

It is additionally an objective to develop VoicePrint matching for suspect identification in multi-speaker environment ("voice-in-a-crowd"). These algorithms will be designed to separate voices in multi-speaker environments to obtain the identification of the speakers.

DETAILED DESCRIPTION OF THE INVENTION

Figure 1:
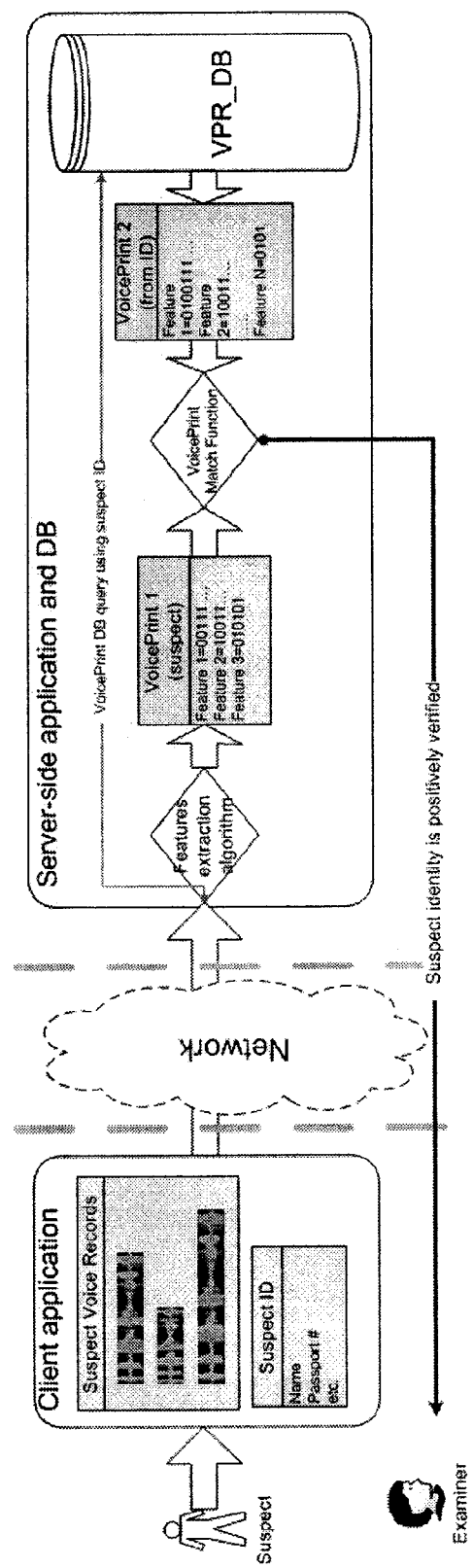
FIG. 1 illustrates information flow in use case UC-A1.

The development roadmap for the VPR system is envisioned as follows:

A. VoicePrint matching for verification of a person's identity (used with cooperative examinees)

B. VoicePrint matching for suspect identification (used with non-cooperative suspects)

C. VoicePrint matching for identification of a small number of highly wanted suspects. Algorithms behind this capability will be optimized for in-depth VoicePrint analysis and target suspect identification from the large set of existing voice records.

D. VoicePrint matching for suspect identification from intercepted communications. Algorithms behind this capability will extract voice samples for suspect identification from intercepted signals which may be of low quality/bandwidth or high noise levels.

E. VoicePrint matching for suspect identification in multi-speaker environment ("voice-in-a-crowd"). These algorithms will be designed to separate voices in multi-speaker environments to obtain the identification of the speakers The subject of the instant invention begins with the implementation of functionalities for Group A and B only. The functionalities corresponding to Groups A and B are equally important to the success of the invention and are given equal weight in system design. The algorithms of each of the groups described above use the technical achievements of the previous groups, thus, the implementation of the most complex capability, namely Group E, will rest upon the results of Groups A, B, C, and D. The VPR solution for this project will assist examiners (VPR users) in making decisions for two primary scenarios or use cases:

I. For use cases referred to as Group A, the VPR solution will be used to identify individuals whose identities have already been verified and whose voiceprint has been previously acquired. If the person's identity is not verified through VPR, a VPR Examiner can take further actions and use other identification methods to obtain a complete verification. Therefore, under this use case, only cooperative and positively verified individuals will pass the VPR check. Examples of such a use case are the typical identity verification of a person who is crossing the border or a person attempting gain access to a controlled area.

II. For use cases referred to as Group B, the VPR solution will be used to identify individuals who have not been positively verified or who have been incorrectly identified (as another person). There are many scenarios wherein a suspect cannot be detained if an identification system does not provide an alert that a person should be detained. Under such circumstances terrorists could be intentionally non-cooperative and attempt to mislead the identification system to pass the check, all the while knowing they will be released in the event of an incorrect identification.

Definitions:

VoicePrintRecognition (VPR)—Refers to the software solution which is the subject of this invention. Also referred to as the "system" or "solution."

VoicePrint—Refers to the data record containing information about a specific person's voice, and produced from a limited number of voice records belonging to a specific person. This can be in the form of a wave file. In the VPR project, the term VoicePrint should not be considered synonymous to current Spectrographic methods.

VoicePrint Acquisition—The process whereby sufficient and verifiable identification data, as well as voice samples, are collected from an examinee to create a VoicePrint record which is matched to a specific identity, and which will be stored in a VPR database. VoicePrint Acquisition may be accomplished when collecting other biometric data, such as fingerprints, iris scans, etc. . . .

VPR server—Refers to a backend VPR server application which will be interfaced to VPR client applications and will manage the VPR database.

VPR DB—Refers to a database of VoicePrint records collected from a field location where VPR is employed. The VPR DB will be accessible only through VPR server application or direct DB administrative control.

Examinee—Refers to a person (role) with an identity known to an examiner, whose voice samples are collected in sufficient quantity to create a VoicePrint record in the VPR DB.

Suspect—Refers to an unknown person (role) whose identity will be checked by VPR. In some of the VPR use cases the VoicePrint of a suspect may not be contained in the VPR DB.

VPR Examiner—Refers to a person (role) who is a trained VPR system user, and whose function is to collect voice samples for production of VoicePrints or to use the VPR for suspect identification/verification.

Voice Record—Refers to a continuous record of a voice (typically from 2 to 25 seconds in duration), meeting the required sound quality criteria, and which will be saved as a standard audio file.

Suspect verification—Refers to the process of obtaining a positive authentication of a suspect's identity. Therefore, having prior information about a suspect's identity in the VPR DB is a prerequisite for a verification attempt. VPR system verification is performed by finding a strong match between a VoicePrint stored in the VPR DB and the new voice record received from the field. Verification will typically be used with cooperative individuals, and may require more voice input data be taken than for a basic identification attempt.

Suspect identification—Refers to the process of obtaining a suspect's identity information from existing VPR DB records. In the current project, the VPR system will be used to obtain suspect identity information by matching newly collected voice samples with previously collected voice samples which are contained in the VPR DB. After an individual's voice sample is input to the VPR system from a field location, the identification process will have the capability to locate and retrieve a suspect's identity among hundreds of thousands of existing voice records. The respective algorithms must be optimized to perform such searches in an acceptable timeframe (only a few minutes for the worst case scenario). Suspect identification will typically be used with uncooperative individuals.

A, B, C, D, E. In the context of test case descriptions we will use various sets which will be denoted by capital letters. All sets have a finite number of elements. |A| refers to the number of elements in set A. A\B is a set with each element belonging to A but not belonging to B.

The VPR system is a decision support tool capable of assisting the military, police or security forces in both of the above use cases. Establishing standard requirements to acquire voice records makes it possible to maintain a current voiceprint database in the theater of operations, since voiceprint collection is an easy process and can be accomplished during other security screening activities.

The technical requirements for acquiring voiceprints consist of having VPR software installed on a PC, a VPR compatible microphone, any area with minimal external noise, and of course, an individual providing verbal answers to questions posed by a VPR examiner. Collecting voice records does not require a permanent connection to a VPR database, since voice records can be uploaded to a VPR database whenever an examiner is online (and able to connect with a VPR DB).

Once uploaded into the VPR DB, individual voice records become available for all VPR users with installed VPR client software. VPR client software will provide examiners with an easy-to-use and intuitive interface for obtaining collected voice records and evaluating VPR identification results in order to make an informed decision under various scenarios. The VPR server system will also have the capability to interface with external systems to leverage previously acquired voiceprint and other helpful records.

The instantly disclosed VoicePrint technology consists of several key components:

1. Pre-processing of records (normalization, basic noise filtering);
2. Features extraction and creation of the VoicePrint object; and
3. Calculation of a match or matches between VoicePrints (using a specially designed function).

During VPR system operation a set of voice features will be extracted. These features will include:
  Parameters from resonance filter treatment
  Parameters extracted from fast Fourier transform
  Cepstral coefficients
  Linear prediction coefficients Language Dependencies:

VPR will be designed for global application. VPR functionality, performance and quality will not be language dependent; however, performance of the VPR system can be optimized for a specific geographic/language area, since individuals belonging to very different language groups have dramatically different voice properties. VPR will include the capability to "fine tune" its accuracy rates for specific geographic areas and language groups. This customizable feature makes the system more adaptable to the broad applications it is likely to encounter when used by the US military.

System Performance:

The verification algorithm has real-time performance. Excluding overheads for communication and files transmission, the VPR server will give an output result of verification in approximately two seconds after input of suspect's voice records into VPR server application.

While the actual performance of the identification algorithm is difficult to estimate, in the worst case scenario the processing time of the individual identification attempt by the VPR server (a VPR database containing less than 100,000 records) is not expected to exceed 5 minutes from the time of input of suspect's records into VPR server.

Use of Standards:

The VPR will use open standards to the extent feasible (e.g., Common Biometrics Exchange File Format [CBEFF], Biometrics Application Programming Interface [BioAPI], ANSI/NIST-ITL 1-2000, and INCITS/M1 standards).

Although the features to be extracted from the voice for the creation of a voice print are well known, a specific procedure for extracting each feature may have a number of settings and variables. After the specifics of the extraction procedure are defined for each feature, they are applied to voice records and the extracted numeric values are stored in VoicePrint data record. Obviously the VPR DB will have many other records (apart from VoicePrint) playing utility roles.

A special VoicePrint match function would be designed and optimized during system development. This match function is effectively a measurement of the 'distance' between the two arbitrary VoicePrint records. The match function would be designed to work with equal effectiveness for voiceprint matching regardless of the language, geographic location, and other factors. Nonetheless, a regional or language-specific "tuning" capability would be available to optimize accuracy. During the research phase of the project, the project team would use proven techniques involving artificial neural networks to optimize the specific parameters of the voice feature extraction process, as well as the particular form of match function. During this project, artificial neural networks will be used only for optimization purposes. The initial model for the match function will be taken from the "LIRA classifier," which has shown the best practical results (LIRA-based classifiers are recognized as the world's best for handwritten text recognition). Such match functions have previously been researched and developed by the instant inventor, which are the source for numeric estimations of effectiveness criteria mentioned herein. The match function will be stable across the database of VoicePrints and lifecycle of the system. However, as mentioned above, the match function can be optimized for large geographic regions (such as the Middle East or Asia-Pacific), thus providing higher accuracy rates for those areas.

The developed neural classifier LIRA (LImited Receptive Area classifier) is based on Rosenblatt's perceptron principles. To adapt Rosenblatt's perceptron for speaker identification some changes were made in the perceptron structure, training and recognition algorithms.

Rosenblatt's perceptron contains three layers of neurons. The first layer S corresponds to the field of interest. In technical terms it corresponds to the input pattern. The second layer A called the associative layer which corresponds to the feature extraction subsystem. The third layer R corresponds to output of the entire system. Each neuron of this layer corresponds to one of the output classes. In the speaker identification task this layer contains neurons corresponding to speaker names. Connections between the layers S and A are established using a random procedure and cannot be changed by perceptron training. They have the weights 0 or 1.

Connections between layers A and R are established by the principle when each neuron of the A-layer is connected with all neurons of the R-layer. Initially the weights are set to 0. The weights are changed during the perceptron training. The rule of weight-changing corresponds to the training algorithm. A training algorithm was used which is slightly different from Rosenblatt's. The random procedure of S-connections establishment has also been modified. The latest modifications are related to the rule of winner selection in the output R-layer.

Rosenblatt Perceptrons.

The 3-layer Rosenblatt perceptron contains the sensor layer S, the associative layer A and the reaction layer R. Many investigations were dedicated to perceptrons with one neuron in layer R (R-layer). Such perceptron can recognize only two classes. If the output of the R neuron is higher than predetermined threshold T, the input pattern belongs to class 1. If it is lower than T the input pattern belongs to class 2. The sensor layer S (S-layer) contains two-state $\{-1, 1\}$ elements. The element is set to 1 if it belongs to object pattern and set to $-1$, if it belongs to background.

Associative layer A (A-layer) contains neurons with a 2-state $\{0, 1\}$ output. Inputs of these neurons are connected with outputs of the S-layer neurons with no modifiable connections. Each connection may have the weight 1 (positive connection); or the weight $-1$ (negative connection). Let the threshold of such neuron equals to number of its input connections. This neuron is active only in the case of all positive connections corresponding to the object and negative connections corresponding to background.

The neuron R is connected with all neurons of the A-layer. The weights of these connections are changed during the perceptron training. The most popular training rule is increasing the weights between active neurons of the A-layer and neuron R if the object belongs to class 1. If the object belongs to the class 2 corresponding weights decrease. It is known that such a perceptron has fast convergence and can form nonlinear discriminating surfaces. The complexity of discriminating surface depends on the number of A-layer neurons.

Description of the Rosenblatt Perceptron Modifications

Several changes to the perceptron structure to create the neural classifiers for speaker identification were proposed. Each sound record is divided into an interval of 15 ms length. At each interval is calculated resonance filter output. The filter frequencies are placed in a non-uniform scale which is close to the so called mel scale.

A binary pattern is obtained from the filters output pattern by means of the following procedure. The threshold th is computed as:

$$th = 2 * \left( \sum_{i=1}^{W_S} \sum_{j=1}^{H_S} b_{ij} \right),$$

where $H_S$—the number of rows (filters) of the pattern; $W_S$—the number of columns of the pattern—time sequential intervals; $b_{ij}$—filter output; $s_{ij}$—resulting binary pattern:

$$s_{ij} = \begin{cases} 1, & \text{if } b_{ij} > th, \\ -1, & \text{if } b_{ij} \leq th. \end{cases}$$

$H_S=32$ $W^s=24$. For the first modification of the simple Rosenblatt perceptron, neurons were included into R-layer. In this case it is necessary to introduce the rule of winner selection. In the first series of experiments we used the simplest rule of winner selection. The neuron from R-layer having the highest excitation determines the class under recognition. The second modification was made in the training process. Let the neuron-winner have excitation $E_w$, with its nearest competitor having excitation $E_c$. If $$(E_W - E_C)/E_W < T_E$$

the competitor is considered as the winner, where $T_E$ is the superfluous excitation of the neuron-winner.

The third modification is concerned with connections. The connections between A-layer and R-layer of the Rosenblatt perceptron could be negative and positive. Only positive connections were used. In this case, the training procedure is the following: during the recognition process we obtain excitations of R-layer neurons. The excitation of neuron $R_j$ corresponding to correct class is decreased by the factor $(1-T_E)$. After this the neuron having maximum excitation $R_k$ is selected as the winner.

If j=k, nothing to be done.
If j does not equal k, $$w_{ij}(t+1) = w_{ij}(t) + a_i,$$

where $w_{ij}(t)$ is the weight of connection between i-neuron of the A-layer and j-neuron of the R-layer before reinforcement, $w_{ij}(t+1)$ is the weight after reinforcement, $a_i$ is the output signal (0 or 1) of i-neuron of A-layer.

$$w_{ik}(t+1) = w_{ik}(t) - a_i, \text{if } (w_{ik}(t) > 0),$$

$$w_{ik}(t+1) = 0, \text{if } (w_{ik}(t) = 0),$$

where $w_{ik}(t)$ is the weight of connection between i-neuron of the A-layer and k-neuron of the R-layer before reinforcement, $w_{ik}(t+1)$ is the weight after reinforcement. A more detailed description of the training procedure is further provided.

The perceptron with these changes is termed the LImited Receptive Area classifier (LIRA) (FIG. 1). A more general case of such a classifier was developed and named Random Subspace Classifier (RSC).

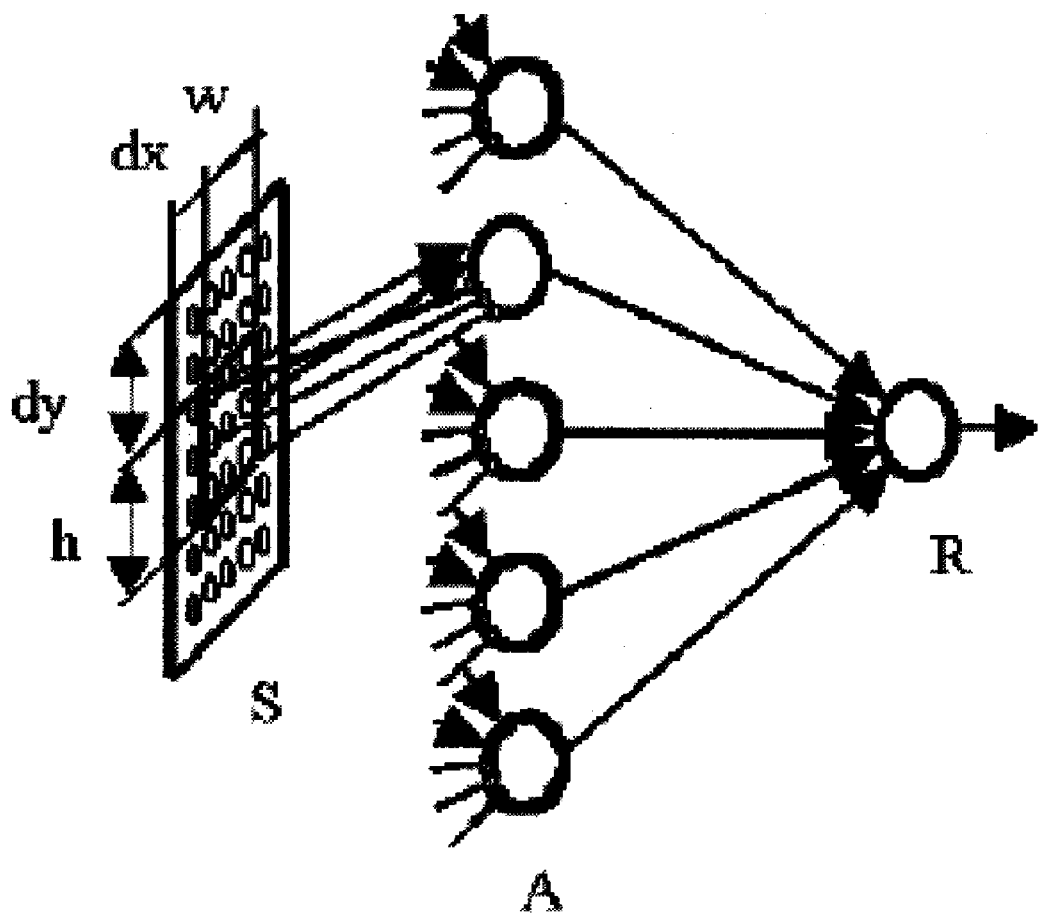
Figure 1: LImited Receptive Area classifier (LIRA)

Each A-layer neuron of LIRA has random connections with the S-layer. To install these connections it is necessary to enumerate all elements of S-layer. Let the number of these elements equals to Ns. To determine the connection of the A-layer neuron a random number uniformly distributed in the range [1, $N_S$] was selected. This number determines S-layer neuron, which will be connected with the mentioned A-layer neuron. The same rule is used to determine all connections between A-layer neurons and S-layer neurons. Frank Rosenblatt proposed this rule. Experience shows that it is possible to improve the perceptron performance by modification of this rule.

The fourth modification is the following. A-layer neuron is connected with S-layer neurons randomly selected not from the entire S-layer, but rather from the rectangle (h*w), which is located in S-layer (FIG. 1).

The distances dx and dy are random numbers selected from the ranges: dx from [0, $W_S$–w] and dy from [0$H_S$–h], where $W_S$, $H_S$ stand for width and height of S-layer.

Mask Design.

The Associative neuron mask is the number of positive and negative connections of the A-layer neuron with the retina. The procedure of random selection of connections is used to design the mask. This procedure begins from the choice of the upper left corner of the rectangle in which all positive and negative connections of the associative neuron are located. The next formulas are used:

$$dx_i = \text{random}_i(W_S - w),$$

$$dy_i = \text{random}_i(H_S - h),$$

where i—the position of a neuron in associative layer A; randomi (z)—the random number which is uniformly distributed in the range [0, z]. After that the each positive and negative connection position within the rectangle is defined by the numbers:

$$x_{ij} = \text{random}_{ij}(w),$$

$$y_{ij} = \text{random}_{ij}(h),$$

where j—the number of i-th neuron connection with retina. Absolute coordinates of the connection on the retina are defined by couple of the numbers:

$$X_{ij} = x_{ij} + dx_i,$$

$$Y_{ij} = y_{ij} + dy_i,$$

Pattern Coding.

Any input pattern defines the activities of the A-layer neurons in one-to-one correspondence. The binary vector which corresponds to the activity of associative neurons is termed the pattern binary code A=$a_1, \ldots, a_n$, (where n—the number of the neurons in A-layer). The procedure, which transforms the input pattern to binary vector A, is termed the pattern coding.

In the system i-th neuron of the A-layer is active only if all the positive connections with the field of interest correspond to the object and all negative connections correspond to the background. In this case $a_i$=1, in opposite case $a_i$=0. From the experience of the work with such systems it is known that the active neuron number m in A-layer must be many times less than whole neuron number n of this layer. In our works we usually use next expression m=c$\sqrt{n}$, where c—constant, which belongs to the range of 1 to 5. This relation corresponds to neurophysiological facts. The number of active neurons in the cerebral cortex is hundreds times less than the total number of neurons.

Taking into account the small number of active neurons it is convenient to represent the binary vector A not explicitly but as a list of numbers of active neurons. Let, for example, the vector A is:

A=00010000100000010000.

The corresponding list of the numbers of active neurons will be 4, 9, and 16. This list is used to save the pattern codes in compact form, and for the fast calculation of the activity of the neurons of output layer. Thus after execution of the coding procedure every pattern has corresponding list of numbers of active neurons.

Training Procedure.

Before training, all the weights of connections between neurons of A-layer and R-layer are set to zero.

1. The training procedure begins from the presentation of the first pattern to the perceptron. The pattern is coded and the R-layer neuron excitation Ei is computed. Ei is defined as:

$$E_i = \sum_{j=1}^{n} a_j * w_{ji}$$

where $E_i$—the excitation of the i-th neuron of the R-layer; $a_j$—the excitation of the j-th neuron of the A-layer; $w_{ji}$—weight of the connection between j-th neuron of the A-layer and i-th neuron of the R-layer.

2. Recognition is required to be robust. After calculation of all neuron excitations of the R-layer the correct name of presented wave record is read from the file. The excitation E of corresponding neuron is recalculated according to the formula:

$$E_k^* = E_k^*(1 - T_E).$$

After that, the neuron (winner) with the maximum activity is found. This neuron presents the recognized speaker name.

Denote the neuron-winner number as $i_w$, and the number of neuron, which really corresponds to the input pattern, as $i_c$. If $i_w = i_c$ then nothing is to be done. If $i_w \neq i_c$ $$(\forall j)(w_{ji_c}(t+1) = w_{ji_c}(t) + a_j)$$

$$(\forall j)(w_{ji_w}(t+1) = w_{ji_w}(t) + a_j)$$

if $(w_{ji_w}(t+1)<0) w_{ji_w}(t+1)+0.$ where $w_{ji}(t)$ is the weight of connection between the j-neuron of A-layer and the i-neuron of the R-layer before reinforcement, whereas $w_{ji}(t+1)$ is the weight after reinforcement.

The training process is carried out iteratively. After representation of all the patterns from the training subset the total number of training errors is calculated. If this number is higher than one percent of total number of patterns then the next training cycle is undertaken. Once the error number is less than one percent the training process is stopped. The training process is also stopped when the cycle number is more than the previously prescribed value. In prior experiments this value was 10 cycles, and in final—40 cycles.

It is obvious that in every new training cycle the pattern coding procedure is repeated and gives the same results as in previous cycles. Therefore in final experiments the coding process of patterns was performed only once and recorded the lists of the active neuron numbers for each pattern in the memory. Later for all cycles the patterns were not used, but rather the corresponding lists of active neurons. Due to this procedure, the training process was significantly accelerated.

Recognition Procedure.

To examine the recognition rate the test set of the voice database is used. Coding and calculation of the neuron activity were made by the same rules as applied to training, but the value $T_E$ (reserve of robustness) was 0. The recognition process for the new classifier differs from the previous ones. In this version distortions in the recognition process were used as well. There is the difference between implementation of distortions during the training session and the recognition session. In the training session each new position of the initial pattern produced by distortions is considered as a new pattern, which is independent from other pattern distortions. In the recognition session it is necessary to introduce a rule of decision-making. All the recognition results of one pattern and its distortions must be used to produce one result, which gives the class name of the pattern under recognition. Two rules of decision-making have been developed.

Rule 1. According to this rule all of the excitations of the R-layer neurons are the sum of all the distortions.

$$E_i = \sum_{k=1}^{d} \sum_{j=1}^{n} a_{kj} * w_{ji},$$

where $E_i$—the excitation of the i-th neuron of the R-layer; $a_{kj}$—the excitation of the j-th neuron of the A-layer in k-th distortion; $w_{ji}$—weight of the connection between the j-th neuron of the A-layer and the i-th neuron of R-layer. Following that, the neuron-winner is selected as result of recognition.

Rule 2. The second rule consists in calculations of the R-layer neurons excitations and selection of neuron-winner and its nearest competitor for each distortion. For the k-th distortion the relation $r_k$ of the neuron-winner excitation $E_{wk}$ to its nearest competitor excitation $E_{ck}$ is calculated.

$$r_k = \frac{E_{wk}}{E_{ck}}.$$

After that the distortion with the maximum $r_k$ is selected. The neuron-winner of this distortion is considered to be the result of recognition.

The voice verification function takes advantage of examinee cooperation to achieve very high levels of accuracy, which are sufficient to authenticate (verify) a person's identity. Verification technology would be based largely on the same principles as identification. The difference for the verification function lies in the size of voice samples provided by cooperative individuals, as well as algorithmic priorities assigned to extracted voice features when composing the match function (Cepstral coefficients are of particularly high priority in the verification match function). Also, the match function will include statistical processing based on the "Hidden Markov Models."

System Overview:

VPR is a software solution which includes a server application consisting of a centralized processing application for the production and storage of voiceprints and a client application installed on examiners' PC/laptop computers. There can be a number of examiners who run their VPR client applications simultaneously. The VPR server application will support many connections with VPR client applications. VPR client applications will not support multiple connections to different VPR servers.

VPR will have the capability to interface with other biometric applications, voice recording software responsible for producing voice record files, communication software responsible for data transport between server and client applications, and other software and OS modules.

Functionality Overview:

A person is stopped or captured by the US military. This person could be an individual suspected of a crime or terrorist activity, or simply an individual who is not considered a suspect, but is examined as part of a routine security screening check. A VPR examiner collects voice samples and personal data (complete identifying data) of an examinee and stores this data for further processing and uploading to the VPR DB. A VPR examiner, based on previous training, can use a soft- or hard-copy version of the VPR User's Manual, as well as VPR client functionality, to ensure that collected voice records are sufficient for further identification/verification of a specific person. All examiners will use VPR compatible microphones for voice recording. If an individual's voice records were successfully uploaded to the VPR server application, and processed by the VPR algorithm, the system will confirm this by a message. If a voiceprint was successfully created, the system will provide a message advising "Voiceprint Created."

At a later time, the VPR system is used for suspect identification/identity verification according to several use cases described herein.

VPR input for verification/identification attempts are a pair of:
(a) a set of collected voice records, and
(b) a suspect's identification information (identification data).

A suspect's voice records are required input for VPR verification attempts, whereas names and other identifying data can be omitted in some of the identification use cases.

Technology Overview:

Each human voice has unique features which can be extracted from voice records and stored in a database for later verification or identification purposes. The challenge for voice biometric algorithms is largely contained in the techniques of extracting these unique features from real-life voice records and their processing for rapid and reliable matching. Moreover, the specific voice features used to develop voiceprint algorithms should be independent, as much as possible, from language and geographic factors that impact upon the voice. On the other hand this 'independence' and 'universality' should not impact negatively upon system effectiveness.

EXAMPLES

Use Cases

Group A

In the use cases of Group A, VPR confirms the identity of a person whose identity has been previously input, verified and who has a voiceprint in the VPR DB. If a person has not been positively identified, an examiner or analyst can take further actions and use other methods to obtain a positive identification. Therefore only cooperative and positively identified individuals will pass this VPR check. In this group of use cases, an individual's name is always provided as input for a VPR verification attempt. If no name is provided or a name is not found in VPR DB, the result of these verification attempts should be considered as negative (person's identity is not verified). The useful function of VPR in use cases of Group A is to verify the identity of an examinee/suspect, thus supporting a decision of positive identification. In other words, the system assists in confirming an individual's identity or provides an alert if the person's identifying data does not correspond to the voice record for that name. The VPR response to a verification attempt will be one of the following:

[BAD RECORD]: suspect voice records are of poor quality and cannot be used for VPR identification.

[NOT FOUND]: suspect name is not found in VPR DB.

[VERIFIED]: suspect name is found in VPR DB and a VoicePrint confirms/verifies the individual's identity (e.g. there is a match between a VoicePrint from VPR DB and an individual's voice records of 97%, i.e. higher than predefined threshold).

[NOT VERIFIED]: suspect identification information is found in VPR DB but a VoicePrint does not confirm the individual's identity (e.g. a match between a VoicePrint from VPR DB and an individual's voice records is below a predefined threshold).

A Real-World Scenario for the Group A Use Case could Occur as Follows:

A specific geographic territory is controlled by US military forces. A highly traveled road within this territory has been bombed several times, and each bombing attempt has targeted US forces. Several blocks of inhabitants located near the road are under suspicion each time US forces are bombed. After each bombing, the suspected inhabitants are detained for thorough security screening. All detained individuals are considered to be suspects and are required to undergo security screening (including voiceprint collection). After the initial screening, a large group of the inhabitants are released since they were determined not be terrorist suspects (based upon all available information). The next time the road is bombed and a group of local inhabitants are considered suspects, the VPR system can be used as a tool to filter out (release) those who were definitely identified as not being terrorists in previous cases. This use of the VPR effectively narrows the pool of potential suspects so that more in-depth screening or investigation can be focused on those who have a higher probability of being involved in the bombings.

Use Case: UC-A1:

An individual (suspect) is stopped or captured by US military forces and a VPR examiner is requested to support the identification process. The suspect identifies himself, provides identifying documents (identity card, passport, etc. . . . ) and gives clear answers to verbal questions posed to him while the VPR examiner makes records of the suspect's voice. The examiner then makes a request to a VPR server for identity verification of the suspect. The examiner uses the VPR response to decide if any further actions should be taken regarding the suspect. If the suspect's name is verified and existing databases indicate the suspect is "clear," a decision to release the suspect would be supported. Otherwise the examiner may transfer suspect for further processing. FIG. 1 illustrates information flow in use case UC-A1.

Use Cases—Group B:

In the use cases for Group B, VPR is used to identify a suspect while the suspect makes an effort to remain unidentified or to be identified as another person (alias). Situations will exist when a suspect cannot be detained if he/she is not positively identified. The suspect could appear to be very cooperative, but in actuality could be attempting to mislead the system. Although the examiner will ask the suspect to provide verifiable identification information for each identification attempt, under this use case it is most likely the suspect's identifying data will not be found in the VPR DB. Under this use case the examiner may also have reason to believe that the suspect is lying about his identity. Further, the suspect could even refuse to identify himself. The use cases for Group B could follow immediately after use cases for Group A for each suspect (as presented in the scenario below); thus, in use cases for Group B it will be assumed that if the suspect's identity could be positively verified, this would have already been accomplished by one of the use cases for Group A.

Therefore, for use cases of Group B, identification attempts are made by omitting the input of identification data into VPR. In such cases, VPR responses to suspect identification attempts will be one of the following:

[BAD RECORD]: suspect voice records are of poor quality and cannot be used for VPR identification.

[IDENTIFIED]: Voiceprint is found in the VPR DB. This means there are one or more voiceprints in the VPR DB that match the individual's Voiceprint, or are contained in a specified subset of the VPR DB which match the voiceprint being examined, and the quantitative measure of such a match is higher than predefined threshold, e.g. the match is higher 97%. If several voiceprints match higher than the established threshold, the one with the closest quantitative match will be provided for identification. However, the system will have the capability to output all other records with matches higher than the threshold. Such additional information would be helpful when using other biometric indicators to establish a positive identification.

[NOT IDENTIFIED]: An examinee/suspect is not identified. This means the system has not located a voiceprint in the VPR DB, or a specified subset of the VPR DB, which matches the individual's voiceprint (i.e. with match higher than the predefined threshold).

A Scenario where Use Cases for Group B could be Used as Follows:

A bombing occurred on territory controlled by the US military. A number of suspects were captured. Having no specific proof as to who was responsible for the bombing, the military releases most of the suspects. However, all potential suspects provided voiceprints before release. Later, another bombing occurs and a large group of suspects is detained again. The terrorists (one or two among the dozens or hundreds detained) have false identifications, and there are not sufficient resources available to check the fingerprints of the detained individuals. The VPR system is used to determine who from the current group of detainees was detained during the previous bombings (i.e. individuals found in a special subset of potential terrorists in VPR DB). Those whose identities were verified using VPR DB records and who pass other security checks can be released. Those who were suspected in the earlier bombings and remain in the detained group will be identified using VPR system, and will undergo more thorough security screening.

Another Example:

A number of bombing suspects were detained and provided voiceprints. They were subsequently released because of a lack of evidence. Later it became apparent that one of the released suspects was a terrorist. The forces around the home village of the terrorist are ordered to check all potential suspects using VPR system. VPR system will identify the terrorist if he is located in the village, even if he presents a false identification.

Figure 2:
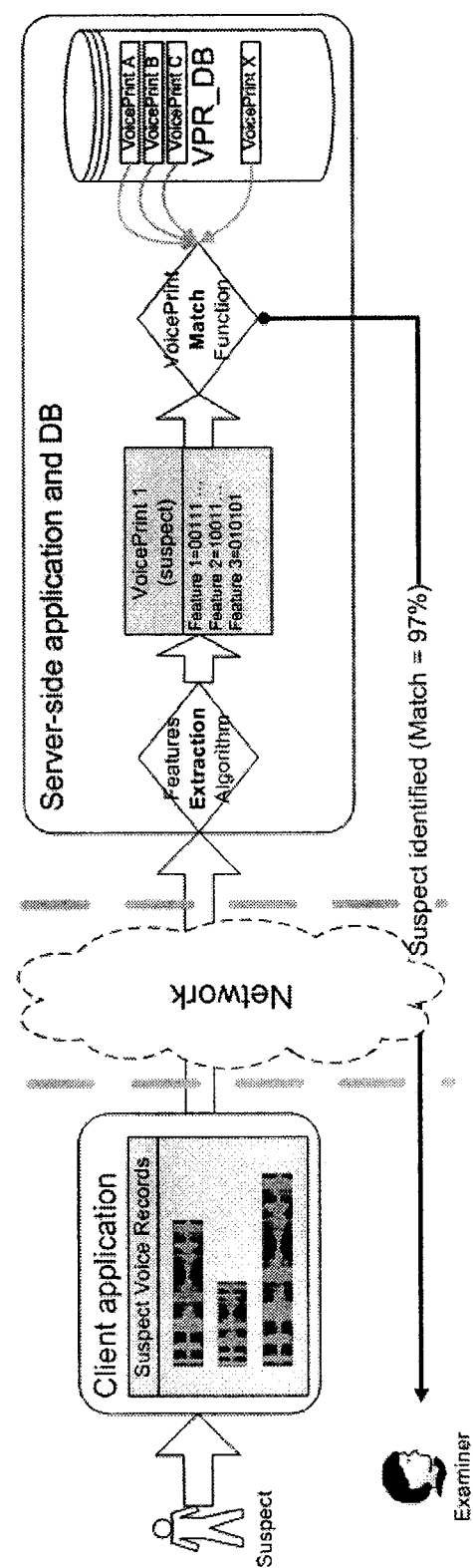
FIG. 2 illustrates information flow in the use case UC-B1.

Use Case: UC-B1:

A suspect is detained or captured by the military and an examiner uses VPR to support the suspect identification process. A suspect identifies himself by name, but: (1) the name is not found in VPR DB, or (2) the name is found but the suspect is uncooperative in providing a voice sample, or (3) verification shows negative results. The VPR examiner takes a voice sample from the suspect and makes a request to VPR for suspect identification omitting suspect's name. The operator uses the VPR results to decide if further actions toward the suspect are required. If the suspect's name is identified and existing databases indicate the suspect is "clear" then the examiner can make an informed decision regarding the individual. Another outcome is that the VPR system can positively identify a suspect (if a voiceprint is on file) and using interfaces with other databases or systems obtain information regarding whether the suspect is wanted. FIG. 2 illustrates information flow in the use case UC-B1.

Use Cases—VoicePrint Acquisition:

VoicePrint acquisition must be carried out by trained VPR examiners. The VPR application will isolate examiners from technical details (voiceprint record format, etc.) and will provide easy functionality for collecting voice records and uploading them into VPR database. A help menu will be available to provide quick help/tips as well as provide comprehensive guidance on how to conduct an interview.

The examinee's emotional or physical state will not influence the ability to take a voiceprint. It could even be beneficial to acquire voice records from examinees in various emotional or physical states. For example, an examinee interview could be divided into several portions (to be conducted during one interview or over an extended period). Such an interview strategy will provide records of the examinee in slightly different states. However, for standard applications, it is best to acquire records from cooperative examinees and the need to acquire voice records of different emotional states should not take precedence. Acquiring voice records from a cooperative examinee, who is in a normal (or relaxed) emotional state, is highly desirable for producing a quality VoicePrint.

Theoretically, VoicePrint acquisition can be accomplished from any examinee pronouncing words by use of his/her voice. However, the quality of a VoicePrint could be substandard if the size of the voice record is insufficient or of a poor quality. Therefore, our VPR client system will be designed to automatically detect whether the collected records are of sufficient size/quality to create a VoicePrint. If the examinee is not cooperative and is not answering specific questions, then the examiner should encourage the examinee to speak about anything. This will ensure that sufficient voice samples will be collected for VoicePrint creation. The VoicePrint acquisition process will be distinguished by two major use cases, depending on whether examinee is cooperative or non-cooperative.

A VPR interview can be combined with traditional suspect interviews; however, this will require making voice recordings with the use of a VPR-compatible microphone.

After obtaining answers for all or a portion of the questions for the specified VPR format, the examiner completes the interview and the VPR system confirms to the examiner whether the size and the quality of records is sufficient to create a VoicePrint.

Figure 3:
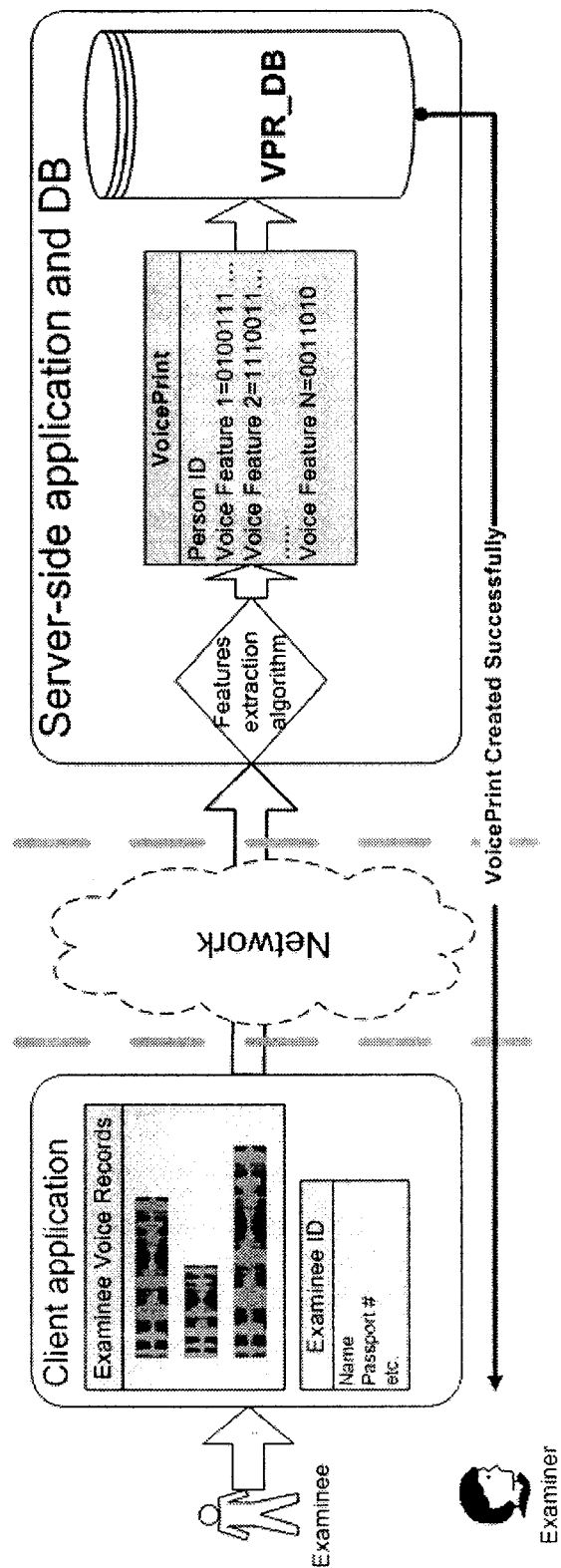
FIG. 3 illustrates information flow on VoicePrint acquisition.

Acquisition of VoicePrints is not dependent on a connection to a VPR server. One of the functions of the VPR client application will allow examiners to upload previously acquired voice records to the VPR server where the VoicePrint will be created and stored. FIG. 3 illustrates information flow on VoicePrint acquisition.

Use Case-UC-AVP:

This use case describes a routine situation for collecting voice records from a person (examinee) during the interview process, which is a dialogue between an examinee and examiner.

The VPR client application will guide the examiner to the appropriate questioning format for an interview and display a list of questions, indicating the next question to be asked and whether or not the voice records have an acceptable quality. One portion of the questions asked to examinee will include standard questions with answers which will not change during the examinee's lifetime. For example, the examinee should be asked to verbally state his date of birth, city of birth, country of birth, mother's first name, the capital of his country of birth, etc. These questions are designed to achieve very high accuracy rates for the 'person verification' process. Records for these questions will be specially identified in the format window. Further, in some instances examinees may be asked to repeat standard phrases, which will be used across the spectrum of examinees.

If an examinee's answer to a question was incorrect (non-intentionally or because the examinee misunderstood the question) the examiner will simply repeat the question and receive correct answer. Immediately after completing the interview, the examiner will have the option to check the quality of records by running an identity validation use case.

Use Case—UC-BVP

This use case describes a scenario with a non-cooperative examinee. As mentioned earlier, non-cooperative examinees should be encouraged to speak so that valid voice records can be acquired. The difference between cooperative and non-cooperative interviews (UC-AVP, UC-BVP) lies in the method of collecting answers to the examiner's questions. The format window will appear identical for both cases; however, if a non-cooperative examinee starts speaking in response to questions but not answering the questions the examiner should nonetheless save these records. For example, assume an examinee is extremely non-cooperative and does not provide answers to the set of required questions. For instance, the examiner asks "What is your date of birth?" and examinee responds "I won't tell you" or "I'm not going to speak with you." In such cases the examiner should save these voice records, not as answers to questions, but rather as random examinee voice records. After receiving several random voice records there will be sufficient records to create a VoicePrint.

In carrying out the above-identified examples, the following system limitations are noted:

Product effectiveness criteria mentioned in section 5 are estimated under the current assumption that individual VPR DB's may contain up to 100,000 VoicePrint records. The system will be fully functional at higher volumes of data, however precise accuracy rate estimations for such cases have not been made for this proposal.

VPR is a decision support tool, meaning it neither provides authentication for strict access control functions, nor should it be is used by individuals having little understanding of the purpose, principles, and process of voice biometric identification/verification.

Test and Evaluation:

Testing and Quality Assurance will be vital parts of the VPR project. The database assembly and algorithm optimization team would be provided with (or will collect) a large set of voice records made under conditions similar to those found in actual military field conditions. Voice records should be representative of persons located in geographic areas which will be the subject for master tests. Along with traditional functionality/unit tests, a special group of tests will be dedicated to measuring the effectiveness of the technology and algorithms. The inventors will provide a large number of fully automated tests for all test groups which will be launched on a daily basis and will ensure quality and effectiveness of the product. The project will also make use of representative user groups which will test the prototype version and release-candidate versions of the product at Phase 2 and Phase 3. At each of these representative tests, an experienced product analyst will carefully gather feedback on user interface and usability.

To describe the records which are used during design, development, testing and master testing (during system handover and transition) we will use the following term: "Universe of Records"—which are all records used in the project (including those used during master system tests in handover). The universe of records consists of records from several groups which may represent persons of different language groups. For example, the universe of records can have voice samples and other data from three thousand persons with an average of ten records per person (30 thousand records), where one thousand records pertain to persons living in Middle-East who speak Arab languages/dialects; one thousand records belongs to people living in Northern America who speak English or Spanish; and one thousand belong to people living in Southern Europe who speak Italian, Portuguese, Greek, etc. The universe of records can also be divided into records used in system development ("Dev records") and those used in master system tests during handover ("Fresh records").

The test cases below describe several key tests which will be used in system handover as well as other key groups of tests. Test scenarios used in system development will also be built upon the basis of tests cases described below.

Each test will have an assigned category. Category A cases referred to as [AUTO_CRITERIA] are automated tests run to calculate and check the effectiveness criteria of algorithms. These test cases will use special application interfaces and programmed scripts. These tests will not make use of user interface.

Test Cases for UC-A1

Test Case TC-A1-FN
Test Category: [AUTO_CRITERIA]

Figure 4:
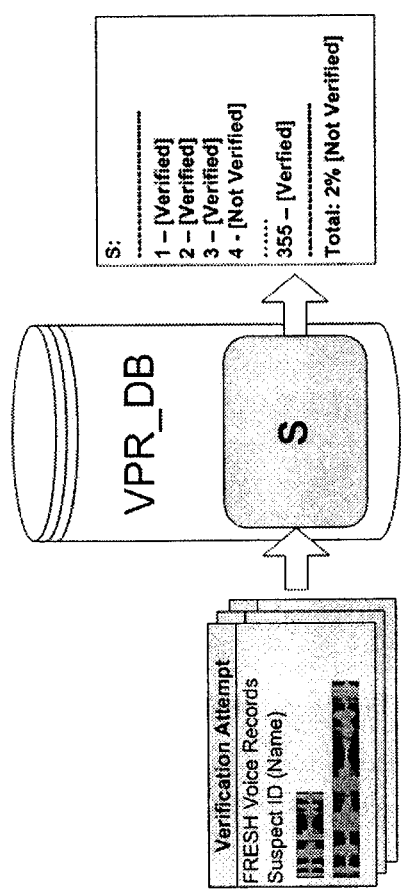
FIG. 4 illustrates Test case TC-A1-FN.

Now referring to FIG. 4, let S be a set of persons with VoicePrints contained in VPR DB. Set S is used for suspect verification according to UC-A1. For each suspect X from S, the test program uses fresh voice records of suspect X (these records were not used in system development or unit testing). For each suspect X from S, the test program makes a verification attempt of X according to UC-A1. In such attempts, VPR inputs are the name of suspect X and fresh voice records of X. The test results will provide the number of verified and not verified replies.

System reply [BAD RECORD] (which is an exception/error for this test) is considered separately. System reply [NOT FOUND] (which is an exception/error for this test) is considered separately.

The number of [NOT VERIFIED] VPR replies is considered for measuring effectiveness criteria R-A1-FN.

Effectiveness criteria R-A1-FN: sequentially running the test case for various randomly selected sets S (with the number of elements in S>100), R-A1-FN is the mean percentage of [NOT VERIFIED] replies (through series of tried subsets S). i.e. R-A1-FN is a false negative (false reject) error rate.

Test Case TC-A1-FP
Test Category: [AUTO_CRITERIA]

Let S be a set of persons with voiceprints contained in VPR DB which is used for suspect verification according to UC-A1. Let B be a set of suspects non intersecting with S. Therefore there are no two similar voiceprints, where one is from S and one from B. For each suspect X from B, the test program uses fresh voice records of X. Let P be a person from S. For each possible combination of persons, P from S and suspect X from B, UC-A1 is launched with VPR inputs being the name of a person P and fresh records of X. The test results will provide the number of verified and not verified replies.

System reply [BAD RECORD] (which is an exception/error for this test) is considered separately. System reply [NOT FOUND] (which is an exception/error for this test) is considered separately. The number of [VERIFIED] VPR replies is considered for measuring the effectiveness criteria R-A1-FP.

Effectiveness criteria R-A1-FP: sequentially running test cases for various randomly selected sets S (with the number of elements in S>100) and B, R-A1-FP is the mean of the percentage of [VERIFIED] replies (through series of tried subsets S and B), i.e. R-A1-FP is a false positive (false accept) error rate.

Test Case TC-A1-NF

This case will test the accuracy of [NOT FOUND] replies in UC-A1. Criteria R-A1-NF are the number of not found replies which should be equal to 0%.

Test Case TC-A1-BR

This case will test the accuracy of [BAD RECORD] reply in UC-A1.

Test Case TC-A1-Fam
Test Category: [AUTO_CRITERIA]

This case will be specially designed to test the accuracy of the verification of persons belonging to one family. False positive and false negative rates should not differ from those obtained in previous test cases.

Test Cases for UC-B1

Test Case TC-B1-F
Test Category: [AUTO_CRITERIA]

Figure 5:
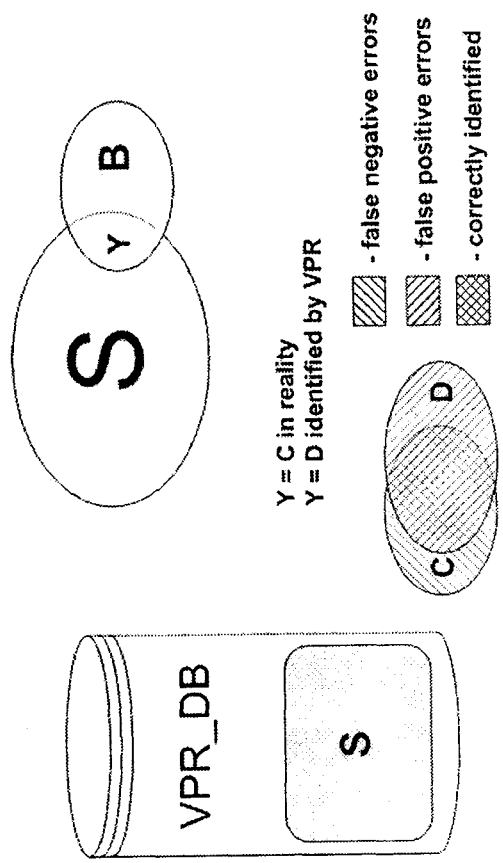
FIG. 5 illustrates Test case TC-B1-F.

Now referring to FIG. 5, let S be a set of persons with voiceprints contained in VPR DB which is used as the master set for suspect identification according to UC-B1. Let set B be a current group of captured suspects, which should be identified against S. For the purpose of the test all suspects from group B should have fresh voice records (not used in development of VPR DB). Let C be the intersection of sets B and S (i.e. suspects from current group with voiceprints contained in VPR DB). For each suspect from B the use case UC-B1 is launched (with no name in VPR input, only the suspect's fresh voice records). Let D be a set of individuals identified by the VPR system after all identification attempts for set B have been made in S. Ideally, sets C and D should be equal, but in reality C and D will not be equal.

Repeating this test case for different sets of S, B, and C the mean (through different test case trials) values of the following effectiveness criteria are measured:

R-B1-FP measures falsely identified suspects (false positive error). A set of falsely identified suspects equals DC (D minus C). R-B1-FP=|D\C|/|B|.

R-B1-FN measures the true suspects who were not identified, when they should have been (false negative error). A set of falsely eliminated suspects (not identified) equals C\D (C minus D). R-B1-FN=|C\D|/|C|.

The tests sets S, B, and C should be consistent with the following limitations for all test case trials: 1000<|S|<10000; 100<|B|<1000; 0<=|C|<=0.5*|B|;

Test Case TC-B1-BR
Test Category: [AUTO_CRITERIA]

This case will test the accuracy of the [BAD RECORD] reply in UC-B1.

Test Cases for VoicePrint Acquisition:

Test cases of this group are designed to test the VPR client application used by examiners. These tests will evaluate the functionality of managing interview formats, the functionality of the format window (obtaining records, normalizing sound quality, a feature to save miscellaneous voice records, a feature to repeat the question by deleting the previous answer record, skipping portions of the format, etc.), finishing interviews, validation of acquired voice records, submitting interview (voice records) to the VPR DB, etc. These tests will use automated scripts as well as testing through user interface.

Test Cases for VoicePrint Identification and Verification:

Test cases of this group are designed to test the VPR client application used by VPR examiners. These tests will evaluate the functionality of suspect verification and identification including managing voice records, obtaining records, normalizing sound quality, connecting to VPR DB, making VPR verification or identification attempts, etc. These tests will use automated scripts as well as testing through user interface.

Test Cases for VPR Server Application and Database:

The server application must meet standard requirements for reliability and security. Access to the VPR database must be allowed only to the VPR server application and VPR DB administrators. VPR DB administrators must enforce respective DB backup and security policies.

Test cases for this group should check the performance and reliability of the VPR server and the VPR DB under various operational conditions.

Effectiveness Criteria:

Table 1 contains values of effectiveness criteria which are to be met by the system. The algorithms for the calculation of these specific effectiveness criteria were described in respective test case descriptions.

VPR system effectiveness will be protected from examinee/suspect attempts to "fool" or cause a malfunctioning of the system by altering his/her voice. Respective system feature will be tested by specific test cases.

TABLE 1

| Key Effectiveness Criteria | Short Description | Target Value Prototype | Target Value Phase 2 | Target Value Phase 3 |
|---|---|---|---|---|
| R-A1-FN | Use case UC-A1, false negative rate | <=20% | <=10% | <=10.00% |
| R-A1-FP | Use case UC-A1, false positive rate | <=4% | <=3% | <=3.00% |
| R-B1-FN | Use case UC-B1, false negative rate | <=7% | <=7% | <=5.00% |
| R-B1-FP | Use case UC-B1, false positive rate | <=22% | <=22% | <=18.00% |

Although the invention has been described primarily as a method, it is contemplated that it may be embodied as computer program instructions on a computer-readable carrier such as a magnetic or optical memory, a magnetic or optical disk of a radio-frequency, audio-frequency or optical wave carrier.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objects and obtain the ends and advantages mentioned, as well as those inherent therein. The methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for identification verification comprising the steps of:

employing a computer based system for obtaining at least one first spoken voice sample of an individual speaking at least one piece of specific data defined as a plurality of scripted words, phrases, answers to predetermined questions and at least one piece of non-specific data defined as one or more unscripted words or phrases;

obtaining a first spoken voice print comprised of one or more vocal characteristics obtained from said voice sample, whereby obtaining said voice print is not dependant upon a specific language spoken thereby allowing for voice prints being obtainable for multiple languages;

storing said at least one first spoken voice print of said individual in a database of said computer based system;

obtaining a voice sample from a cooperative or non-cooperative test subject to be verified or identified as an individual within said database;

employing said computer based system for obtaining at least one second spoken voice print from said voice sample from said cooperative or non-cooperative test subject speaking at least one piece of specific data defined as a plurality of scripted words, phrases, or answers to predetermined questions and at least one piece of non-specific data defined as one or more non-predetermined words or phrases; said computer based system using a first algorithm for determining one or more characteristics of said spoken voice print if said test subject is a cooperative individual and a second algorithm for determining one or more characteristics of said second spoken voice print if said test subject is a non-cooperative individual whereby obtaining said voice print is not dependant upon a specific language spoken thereby allowing for voice prints being obtainable for multiple languages;

comparing by said computer based system or a second remote computer system said at least one second spoken voice print of said test subject to said at least one first voice print of said individual within said database;

determining or verifying if said test subject is said individual within said database based on the results of said comparison; and storing said at least one spoken voice print of said test subject in said database when it is determined that said test subject is not said individual within said database.

2. The method of claim 1, further comprising the step of employing means for obtaining at least one third spoken voice print of said test subject speaking at least one piece of structured data defined as a plurality of scripted words or phrases and at least one piece of unstructured data defined as one or more unscripted words or phrases;
   comparing said at least one third spoken voice print of said test subject to said at least one second voice print of said test subject; and
   determining if said test subject is said individual based on the results of said comparison.

3. The method of claim 2, wherein said test subject is a non-cooperative suspect.

4. The method of claim 3, wherein the step of obtaining said at least one second spoken voice print of said test subject is performed on site.

5. The method of claim 3, wherein the step of obtaining said at least one second spoken voice print of said test subject is performed from an intercepted communication.

6. The method of claim 3, wherein the step of obtaining said at least one second spoken voice print of said test subject occurs in a multi-speaker environment.

7. The method of claim 1, wherein the step of obtaining said at least one second spoken voice print of said test subject is performed on site.

8. The method of claim 1, wherein the step of obtaining said at least one second spoken voice print of said test subject is performed from an intercepted communication.

9. The method of claim 1, wherein the step of obtaining said at least one second spoken voice print of said test subject occurs in a multi-speaker environment.

10. A method for identification verification comprising the steps of:
   obtaining at least one first spoken voice sample of an individual speaking at least one piece of specific data defined as a plurality of scripted words, phrases, or responses to predetermined questions and at least one piece of non-specific data defined as one or more unscripted words or phrases;
   obtaining a first spoken voice print comprised of one or more vocal characteristics obtained from said voice sample, whereby obtaining said voice print is not dependant upon a specific language spoken thereby allowing for voice prints being obtainable for multiple language voice samples;
   storing said at least one first spoken voice print of said individual in a database of a computer based system;
   obtaining a voice sample from a cooperative or non-cooperative test subject to be verified or identified by voice analysis using a computer based system;
   obtaining at least one second spoken voice print from said voice sample from said cooperative or non-cooperative test subject speaking at least one piece of specific data defined as a plurality of scripted words, phrases, or responses to predetermined questions and at least one piece of non-specific data defined as one or more unscripted words or phrases using a computer based system; said computer based system using a first algorithm for determining one or more characteristics of said spoken voice print if said test subject is a cooperative individual and a second algorithm for determining one or more characteristics of said second spoken voice print if said test subject is a non-cooperative individual, whereby obtaining said voice print is not dependant upon a specific language spoken thereby allowing for voice prints being obtainable for multiple language voice samples;
   comparing said at least one second spoken voice print of said test subject to said at least one first voice print of said individual;
   determining or verifying if said test subject is said individual based on the results of said comparison;
   storing said at least one spoken voice print of said test subject in said database when it is determined that said test subject is not said individual.

11. The method of claim 10, further comprising the step of employing means for obtaining at least one third spoken voice print of a test subject speaking at least one piece of specific data defined as a plurality of scripted words, phrases, or responses to predetermined questions and at least one piece of non-specific data defined as one or more unscripted words or phrases;
   comparing said at least one third spoken voice print of said test subject to said at least one second voice print of said test subject; and
   determining if said test subject is said individual based on the results of said comparison.

12. The method of claim 11, wherein said test subject is a non-cooperative suspect.

13. The method of claim 12, wherein the step of employing means for obtaining said at least one second spoken voice print of said test subject is performed on site.

14. The method of claim 12, wherein the step of employing means for obtaining said at least one second spoken voice print of said test subject is performed from an intercepted communication.

15. The method of claim 12, wherein the step of employing means for obtaining said at least one second spoken voice print of said test subject occurs in a multi-speaker environment.

16. The method of claim 10, wherein the step of employing means for obtaining said at least one second spoken voice print of said test subject is performed on site.

17. The method of claim 10, wherein the step of employing means for obtaining said at least one second spoken voice print of said test subject is performed from an intercepted communication.

18. The method of claim 10, wherein the step of employing means for obtaining said at least one second spoken voice print of said test subject occurs in a multi-speaker environment.

19. A computer system implementing a method for identification verification comprising the steps of:
   employing means for obtaining at least one first spoken voice sample of an individual speaking at least one piece of specific data defined as a plurality of scripted words, phrases, or responses to predetermined questions and at least one piece of non-specific data defined as one or more unscripted words or phrases;
   obtaining a first spoken voice print comprised of one or more vocal characteristics obtained from said voice sample, whereby obtaining said voice print is not dependant upon a specific language spoken thereby allowing for voice prints being obtainable for multiple languages;
   storing said at least one first spoken voice print of said individual in a database;
   obtaining a voice sample from a cooperative or non-cooperative test subject to be verified or identified;
   employing means for obtaining at least one second spoken voice print from said voice sample from said cooperative or non-cooperative test subject speaking at least one piece of specific data defined as a plurality of scripted words, phrases, or responses to pre-determined questions and at least one piece of non-specific data defined as one or more unscripted words or phrases; said employing means using a first algorithm for determining one or more characteristics of said spoken voice print if said test subject is a cooperative individual and a second algorithm for determining one or more characteristics of said second spoken voice print if said test subject is a non-cooperative individual, whereby obtaining said voice print is not dependant upon a specific language spoken thereby allowing for voice prints being obtainable for multiple languages;

comparing said at least one spoken voice print of said test subject to said at least one first voice print of said individual;

determining or verifying if said test subject is said individual based on the results of said comparison; and storing said at least one spoken voice print of said test subject in said database if it is determined that said test subject is not said individual.

20. The computer system of claim 19, further comprising the step of employing means for obtaining at least one third spoken voice print of a test subject speaking at least one piece of specific data defined as a plurality of scripted words, phrases, or responses to pre-determined questions and at least one piece of non-specific data defined as one or more unscripted words or phrases;

comparing said at least one third spoken voice print of said test subject to said at least one second voice print of said test subject; and determining if said test subject is said individual based on the results of said comparison.

21. The computer system of claim 19, wherein the step of employing means for obtaining said at least one second spoken voice print of said test subject is performed on site.

22. The computer system of claim 19, wherein the step of obtaining said at least one second spoken voice print of said test subject is performed from an intercepted communication.

23. The computer system of claim 19, wherein the step of employing means for obtaining said at least one second spoken voice print of said test subject occurs in a multi-speaker environment.

24. The computer system of claim 19, wherein said test subject is a non-cooperative suspect.

25. The computer system of claim 24, wherein the step of employing means for obtaining said at least one second spoken voice print of said test subject is performed on site.

26. The computer system of claim 24, wherein the step of employing means for obtaining said at least one second spoken voice print of said test subject is performed from an intercepted communication.

27. The computer system of claim 24, wherein the step of employing means for obtaining said at least one second spoken voice print of said test subject occurs in a multi-speaker environment.

28. A non-transitory machine readable medium storing instructions, that when executed by a computer causes the computer to perform a set of operations comprising:

employing means for obtaining at least one first spoken voice sample of an individual speaking at least one piece of specific data defined as a plurality of scripted words, phrases, or responses to pre-determined questions and at least one piece of non-specific data defined as one or more unscripted words or phrases;

obtaining a first spoken voice print comprised of one or more vocal characteristics obtained from said voice sample, whereby obtaining said voice print is not dependant upon a specific language spoken thereby allowing for voice prints being obtainable for multiple languages;

storing said at least one first spoken voice print of said individual in a database;

obtaining a voice sample from a cooperative or non-cooperative test subject to be verified or identified by voice analysis;

employing means for obtaining at least one second spoken voice print from said voice sample from said cooperative or non-cooperative test subject speaking at least one piece of specific data defined as a plurality of scripted words, phrases, or responses to pre-determined questions and at least one piece of non-specific data defined as one or more unscripted words or phrases; said employing means using a first algorithm for determining one or more characteristics of said spoken voice print if said test subject is a cooperative individual and a second algorithm for determining one or more characteristics of said second spoken voice print if said test subject is a non-cooperative individual, whereby obtaining said voice print is not dependant upon a specific language spoken thereby allowing for voice prints being obtainable for multiple languages;

comparing said at least one spoken voice print of said test subject to said at least one first voice print of said individual;

determining or verifying if said test subject is said individual based on the results of said comparison; and storing said at least one spoken voice print of said test subject in said database if it is determined that said test subject is not said individual.

29. The non-transitory machine readable medium of claim 28, further comprising the step of employing means for obtaining at least one third spoken voice print of a test subject speaking at least one piece of specific data defined as a plurality of scripted words, phrases, or responses to pre-determined questions and at least one piece of non-structured data defined as one or more unscripted words or phrases;

comparing said at least one third spoken voice print of said test subject to said at least one second voice print of said user; and determining if said user is said individual based on the results of said comparison.

30. The non-transitory machine readable medium of claim 29, wherein said test subject is a non-cooperative suspect.

31. The non-transitory machine readable medium of claim 30, wherein the step of obtaining said at least one second spoken voice print of said test subject is performed on site.

32. The non-transitory machine readable medium of claim 30, wherein the step of employing means for obtaining said at least one second spoken voice print of said test subject is performed from an intercepted communication.

33. The non-transitory machine readable medium of claim 30, wherein the step of employing means for obtaining said at least one second spoken voice print of said test subject occurs in a multi-speaker environment.

34. The non-transitory machine readable medium of claim 28, wherein the step of employing means for obtaining said at least one second spoken voice print of said test subject is performed on site.

35. The non-transitory machine readable medium of claim 28, wherein the step of employing means for obtaining said at least one second spoken voice print of said test subject is performed from an intercepted communication.

36. The non-transitory machine readable medium of claim 28, wherein the step of employing means for obtaining said at least one second spoken voice print of said test subject occurs in a multi-speaker environment.

* * * * *